United States Patent
Ohta et al.

(10) Patent No.: US 11,581,543 B2
(45) Date of Patent: Feb. 14, 2023

(54) BINDER COMPOSITION FOR NON-AQUEOUS ELECTROLYTE BATTERIES, AND BINDER AQUEOUS SOLUTION FOR NON-AQUEOUS ELECTROLYTE BATTERIES, SLURRY COMPOSITION FOR NON-AQUEOUS ELECTROLYTE BATTERIES, ELECTRODE FOR NON-AQUEOUS ELECTROLYTE BATTERIES AND NON AQUEOUS ELECTROLYTE BATTERY EACH UTILIZING SAME

(71) Applicant: Kuraray Co., Ltd., Kurashiki (JP)

(72) Inventors: Yuki Ohta, Okayama (JP); Hideharu Iwasaki, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 484 days.

(21) Appl. No.: 16/619,788

(22) PCT Filed: May 25, 2018

(86) PCT No.: PCT/JP2018/020146
§ 371 (c)(1),
(2) Date: Dec. 5, 2019

(87) PCT Pub. No.: WO2018/225539
PCT Pub. Date: Dec. 13, 2018

(65) Prior Publication Data
US 2020/0136145 A1   Apr. 30, 2020

(30) Foreign Application Priority Data

Jun. 7, 2017 (JP) ............................. JP2017-112716
Jun. 7, 2017 (JP) ............................. JP2017-112717
Jun. 7, 2017 (JP) ............................. JP2017-112718

(51) Int. Cl.
*H01M 4/62* (2006.01)
*C08L 29/06* (2006.01)
*C08L 53/00* (2006.01)
*C08L 51/00* (2006.01)

(52) U.S. Cl.
CPC ............ *H01M 4/622* (2013.01); *C08L 29/06* (2013.01); *C08L 51/003* (2013.01); *C08L 53/00* (2013.01); *C08L 2203/20* (2013.01); *C08L 2205/025* (2013.01); *C08L 2205/03* (2013.01)

(58) Field of Classification Search
CPC ..... C08F 216/06; C08F 220/06; C08F 261/04
See application file for complete search history.

(56) References Cited

U.S. PATENT DOCUMENTS

| 4,600,746 | A | * | 7/1986 | Schmukler | ............... C08L 51/06 264/500 |
|---|---|---|---|---|---|
| 6,573,004 | B1 | | 6/2003 | Igarashi et al. | |
| 2005/0069769 | A1 | | 3/2005 | Nakayama et al. | |
| 2015/0280237 | A1 | | 10/2015 | Mukai et al. | |
| 2016/0156024 | A1 | | 6/2016 | Kinpara et al. | |
| 2018/0245028 | A1 | * | 8/2018 | Ookubo | ................... C08L 29/04 |

FOREIGN PATENT DOCUMENTS

| CN | 1124413 A | 6/1996 |
|---|---|---|
| CN | 103563130 A | 2/2014 |
| CN | 103688393 A | 3/2014 |
| CN | 105189347 A | 12/2015 |
| JP | 11-250915 A | 9/1999 |
| JP | 2001-68115 A | 3/2001 |
| JP | 2001-266855 A | 9/2001 |
| JP | 2002-260667 A | 9/2002 |
| JP | 2003-282061 A | 10/2003 |
| JP | 2014-13693 A | 1/2014 |
| JP | 2015-65164 A | 4/2015 |
| JP | 2017-59527 A | 3/2017 |
| KR | 10-2016-0024921 A | 3/2016 |
| TW | 201515309 A | 4/2015 |
| WO | WO 2014/057627 A1 | 4/2014 |
| WO | WO 2014/207967 A1 | 12/2014 |
| WO | WO 2016/067843 A1 | 5/2016 |

OTHER PUBLICATIONS

Combined Taiwanese Office Action and Search Report dated Mar. 7, 2022 in Taiwanese Patent Appiication No. 107118888 (with English summary), 7 pages.
International Search Report dated Jul. 3, 2018 in PCT/JP2018/020146 filed May 25, 2018, 1 page.
Korean Office Action dated Jul. 30, 2021 in Korean Patent Application No. 10-2020-7000228 (with English translation), 9 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

The present invention relates to a binder composition for a non-aqueous electrolyte battery, which is characterized by containing (A) polyvinyl alcohol, (B) at least one selected from a copolymer of vinyl alcohol and ethylenically unsaturated carboxylic acid and a neutralized salt of the copolymer and (C) at least one selected from an amino acid, a carboxylic acid-containing polymer and a polyamine; and a binder aqueous solution for a non-aqueous electrolyte battery, a slurry composition for a non-aqueous electrolyte battery, an electrode for a non-aqueous electrolyte battery, and a non-aqueous electrolyte battery, each containing the binder composition; and others.

19 Claims, No Drawings

BINDER COMPOSITION FOR NON-AQUEOUS ELECTROLYTE BATTERIES, AND BINDER AQUEOUS SOLUTION FOR NON-AQUEOUS ELECTROLYTE BATTERIES, SLURRY COMPOSITION FOR NON-AQUEOUS ELECTROLYTE BATTERIES, ELECTRODE FOR NON-AQUEOUS ELECTROLYTE BATTERIES AND NON AQUEOUS ELECTROLYTE BATTERY EACH UTILIZING SAME

TECHNICAL FIELD

The present invention relates to a binder composition for a non-aqueous electrolyte battery, and a binder aqueous solution for a non-aqueous electrolyte battery, a slurry composition for a non-aqueous electrolyte battery, an electrode for a non-aqueous electrolyte battery, and a non-aqueous electrolyte battery each containing the same.

BACKGROUND ART

In recent years, prevalence of portable terminals such as a portable phone, a notebook type personal computer, and a pad type information terminal apparatus is considerable. A lithium ion secondary battery is frequently used as a secondary battery that is used as a power source for these portable terminals. Since a more comfortable portability is demanded in the portable terminals, scale reduction, thickness reduction, weight reduction, and performance enhancement of the portable terminals are rapidly developing, and the portable terminals are coming to be used in various fields. This trend is currently still continuing, and further scale reduction, thickness reduction, weight reduction, and performance enhancement of batteries used in the portable terminals are also demanded.

A non-aqueous electrolyte battery such as a lithium ion secondary battery has a structure such that a positive electrode and a negative electrode are disposed via a separator and housed in a container together with an electrolytic solution obtained by dissolving a lithium salt such as $LiPF_6$, $LiBF_4$, LiTFSI (lithium (bistrifluoromethylsulfonylimide)), or LiFSI (lithium (bisfluorosulfonylimide)) in an organic liquid such as ethylene carbonate.

Typically, the negative electrode and the positive electrode are formed in such a manner that a slurry for electrodes, which is obtained by dissolving or dispersing a binder and a thickening agent into water or a solvent and mixing the resulting material with an active material, an electroconductive auxiliary agent (electroconductivity imparting agent) that is added in accordance with the needs, and the like (the slurry for electrodes may hereafter simply referred to as a slurry), is applied onto a current collector, followed by drying water or the solvent to bind as a mixed layer. More specifically, for example, the negative electrode is formed in such a manner that a carbonaceous material serving as an active material capable of intercalating and deintercalating lithium ions, acetylene black serving as an electroconductive auxiliary agent added in accordance with the needs, and the like are bound with each other onto a current collector such as copper with use of a binder for secondary battery electrodes. On the other hand, the positive electrode is formed in such a manner that $LiCoO_2$ or the like serving as an active material and an electroconductive auxiliary agent that is similar to that of the negative electrode and added in accordance with the needs are bound with each other onto a current collector such as aluminum with use of a binder for secondary battery electrodes.

In recent years, from the viewpoints of reduction in environmental burden and simplicity of manufacturing equipment, an interest from a slurry containing a solvent to a slurry using water has increased, and in particular, there has been a rapid shift above in the negative electrode.

The most industrially used binder for aqueous media is a system in which carboxymethylcellulose sodium salt (CMC-Na) is added as a thickener to a diene-based rubber such as styrene-butadiene rubber (SBR) (For example, Patent Literature 1). However, the diene-based rubbers such as styrene-butadiene rubber have a low adhesion property to a metal current collector electrode such as copper, and there is a problem in that they cannot be reduced in the amount of use for the purpose of enhancing the adhesiveness between the current collector electrode and the electrode material. Also, there is a problem in that the diene-based rubbers are vulnerable to the heat generated at the time of charging/discharging and have a low capacity retention ratio. Furthermore, since such a diene-based rubber is a two-component system, it has problems such as low storage stability and complicated slurry preparation process in the production.

In order to solve the problem of the SBR/CMC-Na addition system, an acrylic binder such as polyacrylic acid (for example, Patent Literature 2), a polyamide/imide-based binder (for example, Patent Literature 3), or a polyvinyl alcohol-based binder (for example, Patent Literature 4) has been developed.

Acrylic binders are excellent in that they exhibit a high adhesion property and have a low swelling property to electrolytes. On the other hand, there is a problem that the electric resistance is high, the flexibility is poor, and the electrode is easily broken. As for flexibility, for example, Patent Literature 5 discloses that a nitrile group is introduced to improve the flexibility, but the electric resistance still tends to be high.

In addition, polyamide/imide-based binders also exhibit a high adhesion property, and are particularly excellent in electrical stability, thermal stability, and mechanical strength. The problem of the polyamide/imide-based binders is that, like acrylic binders, the electrical resistance is high, the flexibility is poor, and the electrode is easily broken. Utilizing mechanical strength, an example of supplementing flexibility with use of a metal oxide having a large expansion and contraction of the electrode accompanying insertion and desorption of lithium ions during charge and discharge as a negative electrode active material has been reported (for example, Patent Literature 6). However, a combination of the polyamide/imide-based binder and the metal oxide has not fully solved the problems of high resistance and poor flexibility. In addition, the polyamide/imide-based binders have a drawback that they are expensive.

Furthermore, polyvinyl alcohol-based binders also exhibit a high adhesion property and are industrially excellent because the raw material resin is inexpensive, but there is a problem that the slurry stability is low because of high resistance and easy aggregation of active material. On the other hand, an example of adding a general-purpose dispersant such as cellulose derivatives or a thixotropic property imparting agent for the purpose of increasing the viscosity of a binder using a thickener has been reported (for example, Patent Literatures 7 and 8). However, the problem of high resistance in the binder has not been solved.

Recently, demands for extending the usage time of portable terminals and shortening the charging time have increased. In particular, improvements in the battery capacity (low resistance, high efficiency), life (cycle characteristics), and charging speed (rate characteristics) are an urgent need.

The present invention has been made in view of the above problems and circumstances, and the purpose of the invention is to provide a polyvinyl alcohol-based binder composition that is highly adhesive but excellent in slurry stability and in low resistance and to improve battery characteristics (high efficiency) in a non-aqueous electrolyte battery.

CITATION LIST

Patent Literature

Patent Literature 1: JP 2014-13693 A
Patent Literature 2: JP 2002-260667 A
Patent Literature 3: JP 2001-68115 A
Patent Literature 4: JPH 11-250915 A
Patent Literature 5: JP 2003-282061 A
Patent Literature 6: JP 2015-65164 A
Patent Literature 7: JP 2017-59527 A
Patent Literature 8: JP 2001-266855 A

SUMMARY OF INVENTION

The present inventors have made intensive studies in order to solve the above problems and, as a result, have found out that the object can be achieved by using a binder composition for a non-aqueous electrolyte battery that has the following constitution. Based on this finding, the present inventors have made further studies and have thereby completed the present invention.

That is, the binder composition for a non-aqueous electrolyte battery according to one aspect of the present invention (hereinafter also simply referred to as a binder composition) is characterized by containing (A) polyvinyl alcohol, (B) at least one selected from a copolymer of vinyl alcohol and ethylenically unsaturated carboxylic acid and a neutralized salt of the copolymer, and (C) at least one selected from an amino acid, a carboxylic acid-containing polymer, and a polyamine.

DESCRIPTION OF EMBODIMENTS

Hereinafter, embodiments of the present invention will be described in detail, but the present invention is not limited thereto.

The binder composition for a non-aqueous electrolyte battery according to the present embodiment is characterized by containing the following (A), (B), and (C):

(A) polyvinyl alcohol,
(B) at least one selected from a copolymer of vinyl alcohol and ethylenically unsaturated carboxylic acid and a neutralized salt of the copolymer, and
(C) at least one selected from an amino acid, a carboxylic acid-containing polymer, and a polyamine.

With such a configuration, it is possible to obtain a binder composition for a non-aqueous electrolyte battery having a high adhesion property and a slurry stability, and further to realize an improvement of battery characteristics (high efficiency) of the a non-aqueous electrolyte battery with use of such a binder composition.

The content of polyvinyl alcohol as the component (A) in the binder composition of the present embodiment is not particularly limited, but is preferably 50% by weight or less, more preferably 40% by weight or less, still more preferably 30% by weight or less. Further, the lower limit of the content of the polyvinyl alcohol is preferably 0.1% by weight or more, more preferably 0.5% by weight or more, still more preferably 1% by weight or more. When the content of the component (A) exceeds 50% by weight, the electrical resistance may increase, and high charge/discharge efficiency may not be obtained. When the content of the component (A) is less than 0.1% by weight, the slurry stability may deteriorate in some cases.

By containing polyvinyl alcohol as the component (A), it is possible to expect that the effect of the cohesiveness of the binder and the affinity with the current collector electrode are increased due to the hydroxyl group and the adhesion property is improved. Moreover, by mixing different polymers, the molecular weight distribution is apparently broadened, and the crystallinity of the polymer is further lowered, so that an effect of improving flexibility can be expected. In addition, an effect of improving a slurry stability can be expected by suppressing aggregation of a single polymer by intermolecular interaction with a different polymer.

In this embodiment, the degree of saponification of polyvinyl alcohol is not particularly limited, and is usually 50 mol % or more, more preferably 80 mol % or more, and still more preferably 95 mol % or more. When the degree of saponification is low, the polyvinyl alcohol may be hydrolyzed with the alkali metal contained in the binder composition and the stability may not be maintained, which is not preferable.

In the present embodiment, the ethylenically unsaturated carboxylic acid constituting the component (B) is, for example, an ethylenically unsaturated monocarboxylic acid such as acrylic acid, methacrylic acid, and crotonic acid, and an ethylenically unsaturated dicarboxylic acid such as fumaric acid, itaconic acid, and maleic acid. Among these, acrylic acid, methacrylic acid, and maleic acid are particularly preferable from the viewpoints of availability, polymerization property, and product stability. These ethylenically unsaturated carboxylic acids may be used singly or in combination of two or more kinds thereof.

The content ratio of vinyl alcohol and ethylenically unsaturated carboxylic acid in the copolymer of component (B) of the present embodiment is preferably in the range of 100/1 to 1/100 in terms of molar ratio. This is because the advantages of hydrophilicity, water solubility, and affinity for metals and ions as a high molecular weight substance that dissolves in water can be obtained. When the content of the ethylenically unsaturated carboxylic acid is too little, adhesion property and flexibility will be reduced, and when such a content is too much, thermal and electrical stability will be reduced In the (B) at least one selected from a copolymer of vinyl alcohol and ethylenically unsaturated carboxylic acid and a neutralized salt thereof in the copolymer of the present embodiment, the copolymerization form is not particularly limited, and such copolymerization includes random copolymerization, alternating copolymerization, block copolymerization, graft copolymerization and the like. In particular, in order to obtain a high adhesion property, block copolymerization and graft copolymerization in which vinyl alcohol is regularly arranged are preferable. Moreover, a graft copolymerization (graft copolymer) is more preferable from the viewpoint of compatibility of adhesion property with flexibility.

The method for producing the copolymer of the present embodiment is not particularly limited, and any polymerization initiation method such as anionic polymerization, cationic polymerization, or radical polymerization may be used. Any polymer production method may be used including solution polymerization, bulk polymerization, suspension polymerization, dispersion polymerization, or emulsion polymerization.

In the (B) at least one selected from a copolymer of vinyl alcohol and ethylenically unsaturated carboxylic acid and a neutralized salt thereof in the present embodiment, the amount of the ethylenically unsaturated carboxylic acid modification is preferably about 0.1 to 60 mol %. Thereby, there exists an advantage that toughness and low resistance can be provided. A more preferable amount of the ethylenically unsaturated carboxylic acid modification is about 1 to 40 mol %. The amount of the ethylenically unsaturated carboxylic acid modification in the present embodiment can be quantified by, for example, nuclear magnetic resonance spectroscopy (NMR). From the viewpoint of heat resistance, the amount of the ethylenically unsaturated carboxylic acid modification is preferably less than 20 mol %, more preferably less than 15 mol %. From the viewpoint of improving a low resistance, it is also a preferred embodiment that the amount of the ethylenically unsaturated carboxylic acid modification is 11 mol % or more.

The average molecular weight of the copolymer which is the component (B) of the present embodiment is preferably 5,000 to 250,000 in terms of number average molecular weight. When the number average molecular weight of the copolymer is less than 5,000, the mechanical strength of the binder may be lowered. Further, the number average molecular weight is more preferably 10,000 or more, and still more preferably 15,000 or more. On the other hand, when the number average molecular weight of the copolymer exceeds 250,000, the viscosity stability of a slurry composition for a non-aqueous electrolyte battery is reduced, and the aggregation of the slurry occurs, thereby causing insufficient handling properties. The number average molecular weight is more preferably 200,000 or less, and still more preferably 150,000 or less. The number average molecular weight of the copolymer in the present invention means a value measured by a gel permeation chromatography (GPC) method using polyethylene oxide and polyethylene glycol as standard substances and an aqueous column as a column.

In the present embodiment, the neutralized salt of the copolymer is preferably a neutralized product obtained by reaction of active hydrogen of the carbonyl acid generated from the ethylenically unsaturated carboxylic acid with a basic substance to form a salt. In the (B) copolymer of vinyl alcohol and ethylenically unsaturated carboxylic acid and/or a neutralized salt thereof used in the present embodiment, it is preferable to use a basic substance containing a monovalent metal and/or ammonia as the basic substance in view of the binding property as a binder.

Examples of the basic substance containing a monovalent metal that can be used in the present embodiment include an alkali metal hydroxide, such as sodium hydroxide, potassium hydroxide, and lithium hydroxide; an alkali metal carbonate, such as sodium carbonate and potassium carbonate; an alkali metal acetate, such as sodium acetate and potassium acetate; and an alkali metal phosphate, such as trisodium phosphate. Among these, ammonia, lithium hydroxide, sodium hydroxide, and potassium hydroxide are preferable. In particular, use of ammonia or lithium hydroxide is preferable as a binder for lithium ion secondary batteries. The basic substance containing a monovalent metal and/or ammonia may be used alone or in combination of two or more kinds thereof. Further, within a range that does not give adverse effects on the battery performance, a basic substance containing an alkali metal hydroxide such as sodium hydroxide or the like may be used in combination to prepare a neutralized product.

The degree of neutralization is not particularly limited. However, typically, when such a basic substance is used as a binder, it is preferable to use the binder composition in which the degree of neutralization is within a range of 0.1 to 1 equivalent, and more preferably within a range of 0.3 to 1 equivalent. Such a degree of neutralization provides an advantage of lowering the degree of acidity and suppressing decomposition of an electrolytic solution.

In the present embodiment, the degree of neutralization can be determined by using a method such as titration with a base, infrared spectrum, or NMR spectrum. In order to determine the point of neutralization conveniently and precisely, it is preferable to perform titration with a base. A specific method of titration is not particularly limited; however, the titration can be carried out by dissolving in water having less impurity, such as ion-exchange water, and performing neutralization with a basic substance such as lithium hydroxide, sodium hydroxide, or potassium hydroxide. An indicator for the point of neutralization is not particularly limited; however, an indicator that indicates a pH with a base, such as phenolphthalein, can be used.

In the present embodiment, the amount of use of the basic substance containing a monovalent metal and/or ammonia is not particularly limited and is suitably selected in accordance with the purpose of use or the like; however, typically, the amount is preferably 0.1 to 1 equivalent based on the ethylenically unsaturated carboxylic acid unit. When the amount of the basic substance containing a monovalent metal is set to be preferably 0.3 to 1.0 equivalent, more preferably 0.4 to 1.0 equivalent, based on the maleic acid unit in the maleic acid copolymer, a water-soluble copolymer salt with little alkali residue can be obtained.

In the present embodiment, although the copolymerization reaction of the (B) vinyl alcohol and ethylenically unsaturated carboxylic acid and/or the formation of a neutralized salt thereof can be carried out according to a conventional method, a method of carrying out the reaction in the presence of water to obtain a neutralized product as an aqueous solution is simple and preferable.

In the binder composition of the present embodiment, the content of a vinyl alcohol-ethylenically unsaturated carboxylic acid copolymer and/or a neutralized salt thereof as the component (B) is not particularly limited. However, such a content is preferably 99.9% by weight or less, more preferably 99.5% by weight or less, and still more preferably 99% by weight or less. The lower limit of the content is preferably 50% by weight or more, more preferably 60% by weight or more, still more preferably 70% by weight or more, and particularly preferably 80% by weight or more. When the content of the component (B) exceeds 99.9% by weight, the slurry stability may be deteriorated. When the content is less than 50% by weight, the electrical resistance increases, and high charge/discharge efficiency cannot be obtained in some cases.

The component (C) acts as a slurry stabilizer, but it is considered that the amino group and/or carboxyl group of the component (C) of the present embodiment has an effect of stabilizing the slurry by capping the hydroxyl group and carboxyl group of the components (A) and (B). In addition, there is no thickening effect by the addition of (C) component, and the (C) component is completely different from additives aiming at the slurry stability by gelatinization or high viscosity.

In the present embodiment, the component (C) is at least one selected from an amino acid, a carboxylic acid-containing polymer, and a polyamine.

The amino acid constituting the component (C) is not particularly limited. For example, glycine, alanine, valine, leucine, serine, asparagine, glutamine, aspartic acid, glutamic acid, tyrosine, cysteine, lysine, histidine, arginine, etc. or neutralized salts thereof are mentioned. These may be used alone or in combination. The content ratio of all carboxy groups to all amino groups in amino acids (total carboxy groups/total amino groups; molar ratio) is preferably more than 0.1, more preferably 0.5 or more, still more preferably 0.8 or more, and even still more preferably 1.0 or more. Further, the content ratio is preferably 10.0 or less, more preferably 7.0 or less, and still more preferably 6.0 or less.

The amino acid in the present embodiment is preferably not a high molecular weight substance. In particular, the molecular weight of the amino acid is usually preferably less than 500, more preferably less than 400, and still more preferably less than 300. Moreover, it is preferable that the molecular weight of such an amino acid is usually 50 or more. Thus, by using a relatively low molecular weight amino acid, there is an advantage that the slurry can be stabilized without increasing the viscosity of the slurry.

Of these, in particular, aspartic acid and glutamic acid, which have many carboxyl group units, and lysine with many amino group units, etc., are particularly preferably used because they are expected to be highly effective. On the other hand, particularly when combined with a graphite-based active material, since the surface of graphite is hydrophobic, hydrophobic amino acids such as alanine and valine can be preferably used. Alternatively, glycine, aspartic acid, glutamic acid and the like are preferable from the viewpoint of availability and price.

Further, the carboxylic acid-containing polymer constituting the component (C) is not particularly limited. For example, such polymers include homopolymers and copolymers having, as the main skeleton, unsaturated monocarboxylic acids such as acrylic acid, methacrylic acid, crotonic acid, cinnamic acid, α-cyanocinnamic acid, β-styrylacrylic acid, β-furfurylacrylic acid and the like; homopolymers and copolymers having, as the main skeleton, unsaturated dicarboxylic acids such as maleic acid, fumaric acid, citraconic acid, mesaconic acid, 2-pentenedioic acid, methylene succinic acid, allylmalonic acid, isopropylidene succinic acid, 2,4-hexadienoic acid, acetylenedicarboxylic acid; natural products such as humic acid and fulvic acid; high molecular weight polymers of amino acids such as glycine and lysine; and those obtained by neutralizing a part of the carboxylic acid of the polymers. In addition, in the carboxylic acid-containing polymer used in the present embodiment, the carboxylic acid interacts with the amino group in the carboxylic acid-containing polymer, and the capping effect on the components (A) and (B) decreases. Thus, it is preferable not to contain an amino group because there is a concern that it is difficult to contribute to the stabilization of the slurry. Note that the (B) copolymer of vinyl alcohol and ethylenically unsaturated carboxylic acid and the neutralized salt thereof described above do not correspond to the carboxylic acid-containing polymer that is the component (C) of the present embodiment. That is, the (B) copolymer of vinyl alcohol and ethylenically unsaturated carboxylic acid and the neutralized salt are excluded from the carboxylic acid-containing polymer that is the component (C) of the present embodiment.

Among them, in particular, a copolymer unit having more carboxyl groups is considered to have a higher capping effect, so that a copolymer containing maleic acid, for example, a maleic acid-acrylic acid copolymer and an isobutene-maleic acid copolymer, and a neutralized salt thereof are more preferable as the copolymer unit. Furthermore, maleic acid gradually dehydrates to result in ring closure when it reaches a certain high temperature (80° C. or higher). Therefore, when an electrode is dried, the ring closure occurs and the capping with the hydroxyl group of the polyvinyl alcohol as the component (A) is removed, so that it is considered that the hydroxyl group responsible for adhesion property to the current collector electrode is increased. Thus, it is also expected that the adhesion property will be higher.

In addition, polyacrylic acid, humic acid and the like can be preferably used as the component (C) from the viewpoint of availability.

In the present embodiment, the polyamines constituting the component (C) are not particularly limited, and examples thereof include amino group-containing polymers, and preferred specific examples thereof include, for example, polyethyleneimine, polytetramethyleneimine, polyvinylamine, polyallylamine, polydiallylamine and copolymers containing them, dicyandiamide-formalin condensate, and dicyandiamide-alkylene (polyamine) condensate. These may be used alone or in combination. The polyamines used in the present embodiment are preferably compounds that do not contain a carboxy group. When the compound contains a carboxy group, the content ratio of all carboxy groups to all amino groups (total carboxy groups/total amino groups; molar ratio) is preferably 0.1 or less, and preferably 0.01 or less (0 if not contained).

In addition, the polyamines of the present embodiment are preferably those that dissolve in a solution having a pH of less than 10.

Among them, since a primary amine is most easily reacted, an amino group-containing polymer containing a primary amine is preferable. Specifically, polyallylamine and polyethyleneimine are preferably used.

In the present embodiment, the composition ratio of the component (A) and the component (B) is preferably about 0.1:99.9 to 50:50 in terms of solid content weight ratio. More preferably, it is about 1:99 to 40:60. Further, from the viewpoint of obtaining a low resistance, the composition ratio of the component (A) and the component (B) is preferably 1:99 to 30:70, more preferably about 1:99 to 20:80.

In the present embodiment, the component (C) is preferably 0.02 to 5% by weight in terms of solid content with respect to the component (A). More preferably, the solid content is about 0.05 to 3% by weight.

Furthermore, in the present embodiment, the component (C) is preferably 0.05 to 10% by weight as a solid content with respect to the total amount of the components (A) and (B). More preferably, such content is about 0.1 to 6% by weight. If the amount of the component (C) is too small, the slurry stability cannot be obtained, and if the amount of the component (C) is too large, the electrical resistance may be generated, and high charge/discharge efficiency may not be obtained.

In the present embodiment, the component (C) can be added simultaneously with the reaction of a basic substance containing a monovalent metal to obtain the component (B), or can be added after reacting a basic substance containing a monovalent metal with the component (B).

The binder composition of the present embodiment is usually used as a binder aqueous solution for a non-aqueous electrolyte battery containing the above-described binder composition and water.

The binder composition for a non-aqueous electrolyte battery of the present embodiment is usually used preferably as a slurry composition for a non-aqueous electrolyte battery (hereinafter also simply referred to as a slurry composition), which further contains an active material and water in addition to the binder composition described above. That is, the slurry composition of the present embodiment contains the binder composition of the present embodiment mentioned above, an active material, and water.

Also, in the present embodiment, the electrode for a non-aqueous electrolyte battery is characterized by being formed in such a manner that a mixed layer containing at least the binder composition according to the present embodiment and an active material is bound to a current collector. This electrode can be formed by applying the slurry composition described above onto a current collector and thereafter removing the solvent by a method such as drying. If necessary, a thickening agent, an electroconductive auxiliary agent, and the like may be further added into the mixed layer.

Typically, in the slurry composition for a non-aqueous electrolyte battery, when the weight of the active material is 100% by weight, the amount of the binder composition used is usually preferably 0.1 to 15% by weight, more preferably 0.5 to 10% by weight, still more preferably 1 to 8% by weight. If the amount of the binder composition is excessively small, the viscosity of the slurry becomes too low, thereby raising a fear that the thickness of the mixed layer may be thin. If the amount of the binder composition is excessively large, there is a possibility that the discharge capacity may be reduced.

On the other hand, when the weight of the active material is 100% by weight, the amount of water in the slurry composition is usually preferably 30 to 150% by weight, more preferably 70 to 120% by weight.

Examples of the solvent that can be used in the slurry composition according to the present embodiment include, besides water, for example, alcohols such as methanol, ethanol, propanol, and 2-propanol; cyclic ethers such as tetrahydrofuran and 1,4-dioxane; amides such as N,N-dimethylformamide and N,N-dimethylacetamide; cyclic amides such as N-methylpyrrolidone and N-ethylpyrrolidone; and sulfoxides such as dimethyl sulfoxide. Among these, use of water is preferable in view of safety.

Also, besides water, as a solvent of the slurry composition according to the present embodiment, an organic solvent mentioned below may be used in combination within a range of preferably 20% by weight or less with respect to the total amount of the solvent. Such an organic solvent is preferably one having a boiling point of 100° C. or higher to 300° C. or lower at an ordinary pressure, and examples thereof include organic dispersion media such as hydrocarbons (e.g. n-dodecane, etc.); alcohols (e.g. 2-ethyl-1-hexanol, 1-nonanol, etc.); esters (e.g. γ-butyrolactone, methyl lactate, etc.); amides (e.g. N-methylpyrrolidone, N,N-dimethylacetamide, dimethylformamide, etc.); sulfoxides-sulfones (e.g. dimethyl sulfoxide, sulfolane, etc.).

When the slurry composition of the present embodiment is used for negative electrodes, examples of the negative electrode active material that is added to the slurry composition include carbonaceous materials such as amorphous carbon, graphite, natural graphite, mesocarbon microbeads (MCMB), and pitch-based carbon fibers; electroconductive polymers such as polyacene; composite metal oxides and other metal oxides represented by $SiO_x$, $SnO_x$, and $LiTiO_x$ and lithium-based metals such as lithium metal and lithium alloys; and metal compounds such as $TiS_2$ and $LiTiS_2$.

When the slurry composition of the present embodiment is used for a positive electrode, examples of the positive electrode active material added to the slurry composition include lithium iron phosphate ($LiFePO_4$), lithium manganese phosphate ($LiMnPO_4$), lithium cobalt phosphate ($LiCoPO_4$), iron pyrophosphate ($Li_2FeP_2O_7$), lithium cobaltate composite oxide ($LiCoO_2$), spinel type lithium manganese composite oxide ($LiMn_2O_4$), lithium manganese composite oxide ($LiMnO_2$), lithium nickel composite oxide ($LiNiO_2$), lithium niobium composite oxide ($LiNbO_2$), lithium iron composite oxide ($LiFeO_2$), lithium magnesium composite oxide ($LiMgO_2$), lithium calcium composite oxide ($LiCaO_2$), lithium copper composite oxide ($LiCuO_2$), lithium zinc composite oxide ($LiZnO_2$), lithium molybdenum composite oxide ($LiMoO_2$), lithium tantalum composite oxide ($LiTaO_2$), lithium tungsten composite oxide ($LiWO_2$), lithium-nickel-cobalt-aluminum composite oxide ($LiNi_{0.8}Co_{0.15}Al_{0.05}O_2$), lithium-nickel-cobalt-manganese composite oxide ($LiNi_{0.33}Co_{0.33}Mn_{0.33}O_2$), Li-rich nickel-cobalt-manganese composite oxide ($Li_xNi_ACo_BMn_CO_2$ solid solution), nickel manganese oxide ($LiNi_{0.5}Mn_{1.5}O_4$), manganese oxide ($MnO_2$), vanadium-based oxides, sulfur-based oxides, and silicate-based oxides.

In the present embodiment, a thickening agent may be further added into the slurry composition in accordance with the needs. The thickening agent that can be added is not particularly limited, and various kinds of alcohols, unsaturated carboxylic acids and modified products thereof, α-olefin-maleic acids and modified products thereof, celluloses, starches and the like can be used.

The amount of use of the thickening agent that is blended into the slurry composition in accordance with the needs with respect to 100 parts by weight of the active material is preferably about 0.1 to 4% by weight, more preferably 0.3 to 3% by weight, and still more preferably 0.5 to 2% by weight. If the amount of the thickening agent is excessively small, the viscosity of the secondary battery negative electrode slurry is too low, and the thickness of the mixed layer may be thin in some cases. Conversely, if the amount of the thickening agent is excessively large, the discharge capacity may decrease in some cases.

Also, the electroconductive auxiliary agent that is blended into the slurry composition in accordance with the needs may be, for example, a metal powder, an electroconductive polymer, acetylene black, or the like. Typically, the amount of the electroconductive auxiliary agent used with respect to 100% by weight of the active material is preferably 0.1 to 10% by weight, more preferably 0.8 to 7% by weight.

As described above, in the present embodiment, the electrode for a non-aqueous electrolyte battery is characterized in that a mixed layer containing at least the binder composition of the present embodiment and an active material is bound to a current collector. The current collector used in the non-aqueous electrolyte battery negative electrode of the present embodiment is not particularly limited as long as the current collector is made of an electroconductive material and, for example, metal materials such as iron, copper, aluminum, nickel, stainless steel, titanium, tantalum, gold, and platinum can be used. These may be used alone or in combination of two or more kinds thereof at an arbitrary ratio.

In particular, when copper is used as a current collector for the negative electrode, the effect of the non-aqueous electrolyte battery negative electrode slurry of the present invention is most conspicuous. This is because a negative electrode having a high affinity between the binder composition of the present embodiment and a copper foil and having a high adhesion property can be produced. The shape of the current collector is not particularly limited; however, typically, the current collector is preferably in a sheet form having a thickness of about 0.001 to 0.5 mm.

Furthermore, when aluminum is used as a positive electrode current collector, the effect of the non-aqueous electrolyte battery negative electrode slurry of the present invention is most conspicuous. This is because a negative electrode having a high affinity between the binder composition of the present embodiment and a certain aluminum foil and having a high adhesion property can be produced. The shape of the current collector is not particularly limited, but usually the shape is preferably a sheet having a thickness of about 0.001 to 0.5 mm.

A method for applying the slurry onto the current collector is not particularly limited. For example, the method may be the doctor blade method, the dipping method, the reverse roll method, the direct roll method, the gravure method, the extrusion method, the immersion method, the brush coating method, or the like. The amount of applying the slurry is not also particularly limited; however, the amount is generally such that the thickness of the mixed layer containing the active material, the electroconductive auxiliary agent, the binder, and the thickening agent formed after removal of the solvent or dispersion medium by a method such as drying is preferably 0.005 to 5 mm, more preferably 0.01 to 2 mm.

A method of drying the solvent such as water contained in the slurry composition is not particularly limited and may be, for example, aeration drying by warm air, hot air, or low-humidity air; vacuum drying; radiation drying by infrared rays, far infrared rays, or electron beams; or the like. The drying conditions are preferably adjusted so that the solvent can be removed as quickly as possible within a speed range such that cracks may not be generated in the active material layer by stress concentration or the active material layer may not be peeled off from the current collector. Further, it is effective to press the current collector after drying in order to increase the density of the active material of the electrode. Such a pressing method includes mold pressing, roll pressing, or the like.

Furthermore, the present invention includes a non-aqueous electrolyte battery having the electrode described above. The non-aqueous electrolyte battery typically includes a negative electrode, a positive electrode, and an electrolytic solution.

Examples of the non-aqueous electrolyte battery in the present embodiment include a lithium ion battery, a sodium ion battery, a lithium sulfur battery, and an all-solid-state battery.

When the binder composition of the present embodiment is used for a positive electrode, a negative electrode that is normally used for the non-aqueous electrolyte battery such as lithium ion secondary batteries is used without particular limitation. For example, graphite, hard carbon, Si-based oxide, etc. are used as the negative electrode active material. In addition, a negative electrode can be formed by mixing a negative electrode active material with the electroconductive auxiliary agent and a binder such as SBR, NBR, acrylic rubber, hydroxyethyl cellulose, carboxymethyl cellulose, and polyvinylidene fluoride in water or a solvent having a boiling point of 100° C. to 300° C. at an ordinary pressure to prepare a negative electrode slurry; applying the resulting slurry to a negative electrode current collector such as a copper foil; and drying the solvent.

When using the binder composition of the present embodiment for the negative electrode, a positive electrode typically used in a non-aqueous electrolyte battery such as lithium ion secondary batteries can be used as the positive electrode without any particular limitation. For example, a transition metal oxide such as $TiS_2$, $TiS_3$, amorphous $MoS_3$, $Cu_2V_2O_3$, amorphous $V_2O-P_2O_5$, $MoO_3$, $V_2O_5$, and $V_6O_{13}$, and a lithium-containing composite metal oxide such as $LiCoO_2$, $LiNiO_2$, $LiMnO_2$, and $LiMn_2O_4$ are used as the positive electrode active material. Also, a positive electrode can be formed by mixing a positive electrode active material with the electroconductive auxiliary agent and a binder such as SBR, NBR, acrylic rubber, hydroxyethyl cellulose, carboxymethyl cellulose, and polyvinylidene fluoride in water or a solvent having a boiling point of 100° C. or more and 300° C. or less at an ordinary pressure to prepare a positive electrode slurry; applying the resulting slurry to a positive electrode current collector such as aluminum; and drying the solvent from the applied slurry.

Also, an electrode containing the binder composition of the present embodiment can be used for both the positive electrode and the negative electrode.

Also, in the non-aqueous electrolyte battery of the present embodiment, an electrolytic solution obtained by dissolving an electrolyte into a solvent can be used. The electrolytic solution may be either in a liquid form or in a gel form as long as the electrolytic solution is one used in an ordinary non-aqueous electrolyte battery such as a lithium ion secondary battery, and an electrolytic solution exhibiting a function as a battery in accordance with the types of the negative electrode active material and the positive electrode active material may be suitably selected. As a specific electrolyte, for example, any lithium salts conventionally known can be used, and examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and lower aliphatic carboxylic acid lithium.

The solvent in which such an electrolyte is dissolved (electrolytic solution solvent) is not particularly limited. Specific examples thereof include carbonates such as propylene carbonate, ethylene carbonate, butylene carbonate, dimethyl carbonate, and diethyl carbonate; lactones such as γ-butyrolactone; ethers such as trimethoxymethane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile and nitromethane; organic acid esters such as methyl formate, methyl acetate, ethyl acetate, butyl acetate, methyl propionate, and ethyl propionate; inorganic acid esters such as triethyl phosphate, dimethyl carbonate, and diethyl carbonate; diglymes; triglymes; sulfolanes; oxazolidinones such as 3-methyl-2-oxazolidinone; and sultones such as 1,3-propanesultone, 1,4-butanesultone, and naphthasultone. These may be used alone or in combination of two or more kinds thereof. When an electrolytic solution in a gel form is used, a nitrile-based polymer, an acryl-based polymer, a fluorine-based polymer, an alkylene oxide-based polymer, or the like can be added as a gelling agent.

A method for producing the non-aqueous electrolyte battery of the present embodiment is not particularly limited and, for example, the following production method can be exemplified. That is, a negative electrode and a positive electrode are superposed with a separator such as a poly-propylene porous membrane interposed therebetween, and the resultant product is put into a battery container after being subjected to winding, folding, or the like in accordance with the shape of the battery, followed by injecting an electrolytic solution and sealing. The shape of the battery may be any of a known coin type, button type, sheet type, cylindrical type, prismatic type, and flat type.

The non-aqueous electrolyte battery of the present embodiment is a battery in which adhesion property and improvement of battery characteristics are compatible with each other, so that the battery is useful for various purposes. For example, the battery of the present embodiment is extremely useful also as a battery used in portable terminals in which scale reduction, thickness reduction, weight reduction, and performance enhancement are demanded.

As described above, the present specification discloses techniques in various modes. Among these, principal techniques are summarized as follows.

That is, the binder composition for the non-aqueous electrolyte battery according to one aspect of the present invention (hereinafter, also simply referred to as a binder composition) includes (A) polyvinyl alcohol, (B) at least one selected from a copolymer of vinyl alcohol and ethylenically unsaturated carboxylic acid and a neutralized salt thereof, and (C) at least one selected from an amino acid, a carboxylic acid-containing polymer, and a polyamine.

It is considered that such a configuration can maintain the binding property between the active materials and the current collector electrode as well as the slurry stability, thereby being able to improve the battery characteristics.

In the binder composition for the non-aqueous electrolyte battery, the (B) at least one selected from a copolymer of vinyl alcohol and ethylenically unsaturated carboxylic acid and a neutralized salt thereof is preferably copolymerized in the form of block copolymer. Thereby, a higher adhesion property is considered to be able to be obtained.

Furthermore, it is preferable that the (B) at least one selected from a copolymer of vinyl alcohol and ethylenically unsaturated carboxylic acid and a neutralized salt thereof is copolymerized in the form of graft copolymerization. Thereby, both adhesion property and flexibility are considered to be able to be achieved In addition, in the binder composition for the non-aqueous electrolyte battery, the amount of the ethylenically unsaturated carboxylic acid modification in the (B) at least one selected from a copolymer of vinyl alcohol and ethylenically unsaturated carboxylic acid and a neutralized salt thereof is preferably 0.1 to 60 mol %. Thereby, it is considered that toughness and low resistance can be imparted.

Furthermore, the content of the component (B) in the binder composition is preferably 50.0 to 99.9% by weight. Thereby, it is considered that slurry stability and higher charge/discharge efficiency can be obtained.

In the binder composition for the non-aqueous electrolyte battery, the component (C) includes a carboxylic acid-containing polymer, and it is preferable that the carboxylic acid-containing polymer is at least one selected from the group consisting of a maleic acid-acrylic acid copolymer, an isobutene-maleic acid copolymer, and a neutralized salt thereof. Thereby, it is considered that the stability of the obtained slurry is further increased.

Alternatively, in the binder composition for the non-aqueous electrolyte battery, the component (C) preferably includes a polyamine.

A binder aqueous solution for a non-aqueous electrolyte battery according to still another aspect of the present invention is characterized by containing the binder composition and water.

A slurry composition for a non-aqueous electrolyte battery according to still another aspect of the present invention is characterized by containing the binder composition, an active material, and water.

An electrode for a non-aqueous electrolyte battery according to still another aspect of the present invention is characterized in that a mixed layer containing the binder composition and the active material is bound to a current collector.

A nonaqueous electrolyte battery according to still another aspect of the present invention has the above electrode for a non-aqueous electrolyte battery.

EXAMPLES

Hereinafter, Examples of the present invention will be described, but the present invention is not limited thereto.

Test Example 1: Test of Binder Composition Containing Amino Acid as Component (C)

Example 1

<Synthesis of Copolymer of Vinyl Alcohol and Ethylenically Unsaturated Carboxylic Acid>

Commercially available polyvinyl alcohol 100 g (28-98 s, manufactured by Kuraray Co., Ltd.) was irradiated with an electron beam (30 kGy). Next, 33.4 g of acrylic acid and 466.6 g of methanol were charged into a reactor equipped with a stirrer, a reflux condenser, a nitrogen inlet tube, and a particle addition port, and the system was purged with nitrogen for 30 minutes while bubbling nitrogen. The polyvinyl alcohol (100 g) irradiated with an electron beam was added thereto, and the mixture was stirred and heated under reflux for 300 minutes in a state where the particles were dispersed in the solution, thereby to perform graft polymerization. Thereafter, the particles were collected by filtration and vacuum-dried at 40° C. overnight to obtain a desired copolymer. The amount of ethylenically unsaturated carboxylic acid modification of the obtained copolymer was 7.3 mol %.

<Preparation of Neutralized Salt of Copolymer of Vinyl Alcohol and Ethylenically Unsaturated Carboxylic Acid>

Lithium hydroxide in an amount of 0.5 equivalents relative to the carboxylic acid unit in the polymer was added to 100 g of a 10% by weight aqueous solution of the copolymer of vinyl alcohol and acrylic acid obtained above, and the mixture was heated and stirred at 80° C. for 2 hours and then cooled to room temperature.

<Number Average Molecular Weight of Neutralized Salt of Copolymer of Vinyl Alcohol and Ethylenically Unsaturated Carboxylic Acid>

Using a size exclusion high performance liquid chromatography device "GPC-101" manufactured by Showa Denko K.K., two aqueous columns: "TSK gel GMPWXL" (manufactured by Tosoh Corporation) connected in series, standard samples: polyethylene oxide and polyethylene glycol, solvent and mobile phase: 0.1 mol/L aqueous sodium nitrate solution under the conditions of flow rate: 0.7 L/min, temperature: 25° C., and detector: RI, the number average molecular weight of the neutralized salt of a part of vinyl alcohol-ethylenically unsaturated carboxylic acid copolymer was measured. The results are listed in Tables 1 to 3, respectively.

<Preparation of Binder Aqueous Solution>

A commercially available polyvinyl alcohol (28-98 s, saponification degree: 98, manufactured by Kuraray Co., Ltd.) (A-1) was added to a 10% by weight aqueous solution (B-1) of a neutralized salt of the copolymer of vinyl alcohol and ethylenically unsaturated carboxylic acid obtained above so as to have a solid content in a weight ratio of (A-1):(B-1)=10:90. Further, glycine (manufactured by Wako Pure Chemical Industries, Ltd.) as an amino acid was added to the mixture of (A-1) and (B-1) at 0.3% by weight as a solid content to prepare a binder aqueous solution.

<Measurement of Melting Point of Binder Composition>

Using a solid obtained by drying 1 g of the binder aqueous solution with a hot air dryer for 1 hour at 105° C., differential scanning calorimetry was performed with a thermal analyzer (manufactured by Yamato Scientific Co., Ltd.). The measurement was performed at a measurement temperature range of 50° C. to 1000° C. and a temperature rising rate of 10° C./min. The results are shown in Table 1 below.

<Preparation of Slurry>

Preparation of an electrode slurry was carried out in the following manner. With respect to 96 parts by weight of artificial graphite (FSN-1, manufactured by Shanshan Technology, China) serving as a negative electrode active material, a 10% by weight aqueous solution of the binder composition at 3 parts by weight in terms of solid components and Super-P (manufactured by TIMCAL Ltd.) serving as an electroconductive auxiliary agent (electroconductivity imparting agent) at 1 part by weight in terms of solid components were put into an exclusive-use container. Then, water was added thereto so that the resulting slurry solid content concentration was as shown in Table 1, followed by kneading with use of a planetary stirrer (ARE-250, manufactured by Thinky Corporation), thereby to prepare a slurry for electrode coating. The composition ratio of the active material and the binder in the slurry was in a weight ratio of graphite powder:electroconductive auxiliary agent:binder composition=96:1:3 in terms of solid components.

<Slurry Stability>

In order to confirm the stability of the obtained slurry, the state of particle sedimentation immediately after the preparation of slurry was visually confirmed. As evaluation criteria, a slurry in which settling did not occur for 3 hours or more was evaluated as ⊙, a slurry in which settling occurred in 30 minutes to 3 hours was evaluated as Δ, and a slurry in which settling occurred within 30 minutes was evaluated as x. The results are shown in Table 1 below.

<Preparation of Battery Negative Electrode>

The obtained slurry was applied onto a copper foil (CST8G, manufactured by Fukuda Metal Foil & Powder Co., Ltd.) of a current collector with use of a bar coater (T101, manufactured by Matsuo Sangyo Co., Ltd.), and primary drying was carried out at 80° C. for 30 minutes with use of a hot air dryer, followed by performing a rolling treatment using a roll press (manufactured by Hohsen Corp.). Thereafter, a battery electrode (φ 14 mm) was stamped out from the pressed product and then subjected to secondary drying at 140° C. for 3 hours under reduced pressure conditions, thereby to prepare an electrode for coin batteries.

<Preparation of Test Electrodes for Peeling Strength and Toughness>

The obtained slurry was applied onto a copper foil (CST8G, manufactured by Fukuda Metal Foil & Powder Co., Ltd.) of a current collector with use of a bar coater (T101, manufactured by Matsuo Sangyo Co., Ltd.), and primary drying was carried out at 80° C. for 30 minutes with use of a hot air dryer, followed by performing a rolling treatment using a roll press (manufactured by Hohsen Corp.) to give an electrode (film thickness: about 35 μm). The test shown in the title was carried out using this electrode.

<Measurement of Electrode Peeling Strength>

The strength at which an electrode was peeled off from a copper foil serving as a current collector electrode was measured. As the peeling strength, the 180° peeling strength was measured by using a Load Cell of 50 N (manufactured by Imada Co., Ltd.). The slurry-coated surface of the coated electrode for the battery obtained above was bonded onto a stainless steel plate with use of a two-sided tape (two-sided tape manufactured by Nichiban Co., Ltd.), and the 180° peeling strength (peeling width of 10 mm, peeling speed of 100 mm/min) was measured. The above results are shown in the following Table 1.

<Preparation of Battery>

The battery negative electrode obtained above was transferred to a glove box (manufactured by MIWA MFG Co., Ltd.) disposed in an argon gas atmosphere. A metal lithium foil (having a thickness of 0.2 mm, (φ16 mm) was used as a positive electrode. A polypropylene-based film (Celgard #2400, manufactured by Polypore K.K.) was used as a separator, and a solution of lithium hexafluorophosphate (LiPF$_6$) in a mixed solvent obtained through addition of vinylene carbonate (VC) into ethylene carbonate (EC) and ethyl methyl carbonate (EMC) (1M-LiPF$_6$, EC/EMC=3/7 vol %, VC of 2 wt %) was used as an electrolytic solution and injected, so that a coin battery (2032 type) was prepared.

<Charge/Discharge Characteristics Test>

The prepared coin battery was subjected to a charge/discharge test with use of a commercially available charge/discharge tester (TOSCAT3100, manufactured by Toyo System Co., Ltd.). The coin battery was placed in a thermostat of 25° C. and, for charging, constant-current charging of 0.1 C (about 0.5 mA/cm$^2$) relative to the active material amount was carried out until 0 V was attained relative to the electric potential of lithium, and further, constant-voltage charging of 0 V was carried out until 0.02 mA was attained relative to the electric potential of lithium. The capacity at this time was defined as a charging capacity (mAh/g). Subsequently, constant-current discharging of 0.1 C (about 0.5 mA/cm$^2$) was carried out down to 1.5 V relative to the electric potential of lithium, and the capacity at that time was defined as a discharge capacity (mAh/g). The difference between the initial discharge capacity and the charge capacity was determined as an irreversible capacity, and the percentage of discharge capacity/charge capacity was determined as a charge/discharge efficiency. The above results are shown in the following Table 1.

Example 2

A binder aqueous solution was prepared in the same manner as in Example 1, except that 5% by weight of glycine was added as a solid content to the mixture of (A-1) and (B-1) and the mixture was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1 and the peeling strength was measured. The results are shown in Table 1 below.

Example 3

A binder aqueous solution was prepared in the same manner as in Example 2, except that the mixture ratio of (A-1) and (B-1) was (A-1):(B-1)=35:65 by weight, and the mixture was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 4

A binder aqueous solution was prepared in the same manner as in Example 2, except that the mixture ratio of (A-1) and (B-1) was (A-1):(B-1)=45:55 by weight and the mixture was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 5

A binder aqueous solution was prepared in the same manner as in Example 2, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 1, and the binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 6

A binder aqueous solution was prepared in the same manner as in Example 2, except that the amino acid was changed to L-glutamic acid (manufactured by Wako Pure Chemical Industries, Ltd.), and used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 7

A binder aqueous solution was prepared in the same manner as in Example 2, except that the amino acid was changed to L-aspartic acid (manufactured by Wako Pure Chemical Industries, Ltd.), and used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 8

A binder aqueous solution was prepared in the same manner as in Example 2, except that the amino acid was changed to L-lysine (manufactured by Wako Pure Chemical Industries, Ltd.), and used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 9

A target copolymer was synthesized in the same manner as in Example 1 except that 100 g of acrylic acid and 400 g of methanol were added. The amount of ethylenically unsaturated carboxylic acid modification in the obtained copolymer was 26.2 mol %. Further, 0.5 equivalents of lithium hydroxide relative to the carboxylic acid unit in the polymer were added to prepare a neutralized salt (B-2) of the copolymer. Thereafter, the commercially available polyvinyl alcohol (A-1) used in Example 1 was added as a solid content so that the weight ratio of (A-1):(B-2) was 7:93. Furthermore, glycine as an amino acid was added to the mixture of (A-1) and (B-2) as a solid component at 5% by weight to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 10

An electron beam (30 kGy) was irradiated to 100 g of commercially available polyvinyl alcohol (Elvanol 71-30, manufactured by Kuraray Co., Ltd.). Next, 25 g of methacrylic acid and 475 g of methanol were charged into a reactor equipped with a stirrer, a reflux condenser, a nitrogen inlet tube and a particle addition port, and the system was purged with nitrogen for 30 minutes while bubbling nitrogen. The polyvinyl alcohol (100 g) irradiated with an electron beam was added thereto, and the mixture was stirred and heated under reflux for 300 minutes in a state where the particles were dispersed in the solution, thereby to perform graft polymerization. Thereafter, the particles were collected by filtration and vacuum-dried at 40° C. overnight to obtain a desired copolymer. The amount of ethylenically unsaturated carboxylic acid modification of the obtained copolymer was 7.0 mol %. Further, 0.5 equivalents of lithium hydroxide relative to the carboxylic acid unit in the polymer were added to prepare a neutralized salt (B-3) of the copolymer. Thereafter, commercially available polyvinyl alcohol (Elvanol 71-30, saponification degree: 99, manufactured by Kuraray Co., Ltd.) (A-2) was added as a solid content so that (A-2):(B-3) was in a weight ratio of 12:88. Further, glycine as an amino acid in an amount of 5% by weight was added as a solid content to the mixture of (A-2) and (B-3) to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 11

A target copolymer was synthesized in the same manner as in Example 10 except that 100 g of methacrylic acid and 400 g of methanol were added. The amount of ethylenically unsaturated carboxylic acid modification of the obtained copolymer was 34.0 mol %. Further, 0.5 equivalents of lithium hydroxide relative to the carboxylic acid unit in the polymer were added to prepare a neutralized salt (B-4) of the copolymer. Thereafter, the commercially available polyvinyl alcohol (A-2) similar to Example 10 was added as a solid content so that the weight ratio of (A-2):(B-4) was 5:95. Furthermore, glycine as an amino acid was added to the mixture of (A-2) and (B-4) as a solid component at 5% by weight to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 12

A reactor equipped with a stirrer, a reflux condenser, a nitrogen inlet tube, and an initiator addition port was charged with 370 g of water and 100 g of commercially available polyvinyl alcohol (M115 manufactured by Kuraray Co., Ltd.), heated at 95° C. with stirring to dissolve the polyvinyl alcohol, and then cooled to room temperature. The aqueous solution was added with 0.5N sulfuric acid to adjust the pH to 3.0. After addition of 9.9 g of acrylic acid thereto with stirring, the mixture was heated to 70° C. while bubbling nitrogen into the aqueous solution, and further purged with nitrogen by bubbling nitrogen for 30 minutes while maintaining 70° C. After nitrogen substitution, 80.7 g of an aqueous potassium persulfate solution (concentration: 2.5% by weight) was added dropwise to the aqueous solution over 1.5 hours. The entire amount of the aqueous potassium persulfate solution was added, and the temperature was raised to 75° C. The mixture was further stirred for 1 hour and then cooled to room temperature. The obtained aqueous solution was poured onto a PET film and dried in hot air at 80° C. for 30 minutes to produce a film. The film was frozen with liquid nitrogen, pulverized using a centrifugal pulverizer, and further vacuum-dried at 40° C. overnight to obtain a desired copolymer. The amount of ethylenically unsaturated carboxylic acid modification of the obtained copolymer was 6.0 mol %. Further, 0.5 equivalents of lithium hydroxide relative to the carboxylic acid unit in the polymer was added to prepare a neutralized salt (B-5) of the copolymer. Thereafter, a commercially available polyvinyl alcohol (A-1) similar to that in Example 1 was added as a solid content so that the weight ratio of (A-1):(B-5) was 10:90. Furthermore, glycine as an amino acid was added as a solid content in 5% by weight to the mixture of (A-1) and (B-5), thereby to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 13

A target copolymer was synthesized in the same manner as in Example 12, except that 20 g of acrylic acid and 150 g of a potassium persulfate aqueous solution (concentration: 2.5% by weight) were added. The amount of ethylenically unsaturated carboxylic acid modification of the obtained copolymer was 12.0 mol %. Further, 0.5 equivalents of lithium hydroxide relative to the carboxylic acid unit in the polymer were added to prepare a neutralized salt (B-6) of the copolymer. Thereafter, the commercially available polyvinyl alcohol (A-1) used in Example 1 was added as a solid content so that the weight ratio of (A-1):(B-6) was 10:90. Furthermore, glycine as an amino acid was added as a solid component at 5% by weight to the mixture of (A-1) and (B-6), thereby to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 14

A binder aqueous solution was prepared in the same manner as in Example 13, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 13, and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Example 15

A reactor equipped with a stirrer, a reflux condenser, an argon inlet tube, and an initiator addition port was charged with 640 g of vinyl acetate, 240.4 g of methanol, and 0.88 g of acrylic acid, and nitrogen was bubbled through the system for 30 minutes to carry out the nitrogen substitution in the system. Separately, a methanol solution of acrylic acid (concentration: 20% by weight) was prepared as a comonomer sequential addition solution (hereinafter referred to as a delay solution), and argon was bubbled for 30 minutes. The temperature of the reactor was increased, and when the internal temperature reached 60° C., 0.15 g of 2,2'-azobisisobutyronitrile was added to initiate polymerization. During the progress of the polymerization reaction, the prepared delay solution was dropped into the system so that the composition of the monomers (molar ratio of vinyl acetate and acrylic acid) in the polymerization solution became constant. After polymerization at 60° C. for 210 minutes, the polymerization was stopped by cooling. Subsequently, unreacted monomers were removed while sometimes adding methanol under reduced pressure at 30° C. to obtain a methanol solution of polyvinyl acetate modified with acrylic acid. Then, 20.4 g of sodium hydroxide/methanol solution (concentration 18.0% by weight) and 79.6 g of methanol were added to 400 g of polyvinyl acetate methanol solution prepared by adding methanol to a concentration of 25% by weight, and saponification was performed at 40° C. A gelled product was formed within a few minutes after the addition of the sodium hydroxide/methanol solution. This was pulverized by a pulverizer and allowed to stand for 60 minutes at 40° C. to allow saponification to proceed. The obtained pulverized gel was repeatedly washed with methanol and then vacuum-dried at 40° C. overnight to synthesize a desired copolymer. The amount of ethylenically unsaturated carboxylic acid modification of the obtained copolymer was 5.0 mol %. Further, 0.5 equivalents of lithium hydroxide relative to the carboxylic acid unit in the polymer were added to prepare a neutralized salt (B-7) of the copolymer. Thereafter, the commercially available polyvinyl alcohol (A-1) used in Example 1 was added as a solid content so that the weight ratio of (A-1):(B-7) was 10:90. Furthermore, glycine as an amino acid in an amount of 5% by weight was added as a solid component to the mixture of (A-1) and (B-7), thereby to prepare a binder aqueous solution, which was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and a charge/discharge characteristic test was performed. Similarly, a coated electrode for peeling strength was prepared in the same manner as in Example 1, and the peeling strength was measured. The results are shown in Table 1 below.

Comparative Example 1

A binder aqueous solution was prepared in the same manner as in Example 1, except that glycine was not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 2

A binder aqueous solution was prepared in the same manner as in Example 9, except that glycine was not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 3

A binder aqueous solution was prepared in the same manner as in Example 10, except that glycine was not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was produced in the same manner as in Example 1, and the peeling strength was measured. The results are shown in Table 1 below.

Comparative Example 4

A binder aqueous solution was prepared in the same manner as in Example 11, except that glycine was not added, and such binder solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 5

A binder aqueous solution was prepared in the same manner as in Example 12, except that glycine was not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 6

A binder aqueous solution was prepared in the same manner as in Example 13, except that glycine was not added, and such binder solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 7

A binder aqueous solution was prepared in the same manner as in Example 15, except that glycine was not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 8

A binder aqueous solution was prepared in the same manner as in Example 1, except that glycine and polyvinyl alcohol were not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was produced in the same manner as in Example 1, and the peeling strength was measured. The results are shown in Table 1 below.

Comparative Example 9

A binder aqueous solution was prepared in the same manner as in Example 13, except that glycine and polyvinyl alcohol were not added, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 10

A binder aqueous solution was prepared in the same manner as in Example 14, except that glycine and polyvinyl alcohol were not added, and used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 11

A binder aqueous solution was prepared in the same manner as in Example 1, except that glycine and the neutralized salt of vinyl alcohol and ethylenically unsaturated carboxylic acid copolymer were not added, and such binder solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

Comparative Example 12

A binder aqueous solution was prepared in the same manner as in Example 1, except that except that carboxymethylcellulose (Cellogen BSH-6, manufactured by Daiichi Kogyo Seiyaku Co., Ltd.) was added as a thickener instead of amino acid, and such binder aqueous solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 1 below.

TABLE 1

| | BINDER COMPOSITION | | | | | | |
|---|---|---|---|---|---|---|---|
| | (A) POLYVINYL ALCOHOL | | (B) COPOLYMER OF VINYL ALCOHOL AND ETHYLENICALLY UNSATURATED CARBOXYLIC ACID AND/OR NEUTRALIZED SALT THEREOF | | | | |
| | CONTENT (% BY WEIGHT) | DEGREE OF SAPONIFI-CATION (MOL %) | CONTENT (% BY WEIGHT) | AMOUNT OF ETHYLENICALLY UNSATURATED CARBOXYLIC ACID MODIFICATION (MOL %) | ETHYLENICALLY UNSATURATED CARBOXYLIC ACID | COPOLYMER FORM | DEGREE OF NEUTRAL-IZATION |
| EXAMPLE 1 | 10 | 98 | 90 | 7.3 | ACRYLIC ACID | GRAFT | 0.5 |
| EXAMPLE 2 | 10 | 98 | 90 | 7.3 | ACRYLIC ACID | GRAFT | 0.5 |
| EXAMPLE 3 | 35 | 98 | 65 | 7.3 | ACRYLIC ACID | GRAFT | 0.5 |
| EXAMPLE 4 | 45 | 98 | 55 | 7.3 | ACRYLIC ACID | GRAFT | 0.5 |
| EXAMPLE 5 | 10 | 98 | 90 | 7.3 | ACRYLIC ACID | GRAFT | 0.5 |
| EXAMPLE 6 | 10 | 98 | 90 | 7.3 | ACRYLIC ACID | GRAFT | 0.5 |
| EXAMPLE 7 | 10 | 98 | 90 | 7.3 | ACRYLIC ACID | GRAFT | 0.5 |
| EXAMPLE 8 | 10 | 98 | 90 | 7.3 | ACRYLIC ACID | GRAFT | 0.5 |
| EXAMPLE 9 | 7 | 98 | 93 | 26.2 | ACRYLIC ACID | GRAFT | 0.5 |
| EXAMPLE 10 | 12 | 99 | 88 | 7.0 | METHACRYLIC ACID | GRAFT | 0.5 |
| EXAMPLE 11 | 5 | 99 | 95 | 34.0 | METHACRYLIC ACID | GRAFT | 0.5 |
| EXAMPLE 12 | 10 | 98 | 90 | 6.0 | ACRYLIC ACID | BLOCK | 0.5 |
| EXAMPLE 13 | 10 | 98 | 90 | 12.0 | ACRYLIC ACID | BLOCK | 0.5 |
| EXAMPLE 14 | 10 | 98 | 90 | 12.0 | ACRYLIC ACID | BLOCK | 0.5 |
| EXAMPLE 15 | 10 | 98 | 90 | 5.0 | ACRYLIC ACID | RANDOM | 0.5 |
| COMPARATIVE EXAMPLE 1 | 10 | 98 | 90 | 7.3 | ACRYLIC ACID | GRAFT | 0.5 |
| COMPARATIVE EXAMPLE 2 | 7 | 98 | 93 | 26.2 | ACRYLIC ACID | GRAFT | 0.5 |
| COMPARATIVE EXAMPLE 3 | 12 | 99 | 88 | 7.0 | METHACRYLIC ACID | GRAFT | 0.5 |
| COMPARATIVE EXAMPLE 4 | 5 | 99 | 95 | 34.0 | METHACRYLIC ACID | GRAFT | 0.5 |
| COMPARATIVE EXAMPLE 5 | 10 | 98 | 90 | 6.0 | ACRYLIC ACID | BLOCK | 0.5 |
| COMPARATIVE EXAMPLE 6 | 10 | 98 | 90 | 12.0 | ACRYLIC ACID | BLOCK | 0.5 |
| COMPARATIVE EXAMPLE 7 | 10 | 98 | 90 | 5.0 | ACRYLIC ACID | RANDOM | 0.5 |
| COMPARATIVE EXAMPLE 8 | 0 | — | 100 | 7.3 | ACRYLIC ACID | GRAFT | 0.5 |
| COMPARATIVE EXAMPLE 9 | 0 | — | 100 | 12.0 | ACRYLIC ACID | BLOCK | 0.5 |
| COMPARATIVE EXAMPLE 10 | 0 | — | 100 | 12.0 | ACRYLIC ACID | BLOCK | 0.5 |
| COMPARATIVE EXAMPLE 11 | 100 | 98 | 0 | — | ACRYLIC ACID | — | — |
| COMPARATIVE EXAMPLE 12 | 10 | 98 | 90 | 7.3 | ACRYLIC ACID | GRAFT | 0.5 |

TABLE 1-continued

| | BINDER COMPOSITION | | | | | |
|---|---|---|---|---|---|---|
| | (B) COPOLYMER OF VINYL ALCOHOL AND ETHYLENICALLY UNSATURATED CARBOXYLIC ACID AND/OR NEUTRALIZED SALT THEREOF | | (C) AMINO ACID | | HEAT | |
| | KIND OF SALTS | NUMBER AVERAGE MOLECULAR WEIGHT | CONTENT (% BY WEIGHT) RELATIVE TO (A) + (B) | KIND | RESISTANCE MELTING POINT (° C.) | SLURRY SOLID CONTENT CONCENTRATION [wt %] |
| EXAMPLE 1 | Li | 24200 | 0.3 | GLYCINE | 215 | 53.3 |
| EXAMPLE 2 | Li | 24200 | 5 | GLYCINE | 214 | 53.3 |
| EXAMPLE 3 | Li | 24200 | 5 | GLYCINE | 216 | 53.3 |
| EXAMPLE 4 | Li | 24200 | 5 | GLYCINE | 219 | 53.3 |
| EXAMPLE 5 | Li/Na | 24200 | 5 | GLYCINE | 218 | 53.3 |
| EXAMPLE 6 | Li | 24200 | 5 | GLUTAMIC ACID | 216 | 53.3 |
| EXAMPLE 7 | Li | 24200 | 5 | ASPERIC ACID | 216 | 53.3 |
| EXAMPLE 8 | Li | 24200 | 5 | LYSINE | 215 | 53.3 |
| EXAMPLE 9 | Li | 25100 | 5 | GLYCINE | 200 | 54.1 |
| EXAMPLE 10 | Li | | 5 | GLYCINE | 220 | 54.1 |
| EXAMPLE 11 | Li | | 5 | GLYCINE | 210 | 54.6 |
| EXAMPLE 12 | Li | | 5 | GLYCINE | 212 | 53.3 |
| EXAMPLE 13 | Li | | 5 | GLYCINE | 210 | 53.3 |
| EXAMPLE 14 | Li/Na | | 5 | GLYCINE | 210 | 53.3 |
| EXAMPLE 15 | Li | | 5 | GLYCINE | 204 | 55.4 |
| COMPARATIVE EXAMPLE 1 | Li | 24200 | 0 | — | 215 | 56.4 |
| COMPARATIVE EXAMPLE 2 | Li | 25100 | 0 | — | 200 | 56.2 |
| COMPARATIVE EXAMPLE 3 | Li | | 0 | — | 225 | 56.2 |
| COMPARATIVE EXAMPLE 4 | Li | | 0 | — | 209 | 56.3 |
| COMPARATIVE EXAMPLE 5 | Li | | 0 | — | 211 | 56.4 |
| COMPARATIVE EXAMPLE 6 | Li | | 0 | — | 209 | 56.4 |
| COMPARATIVE EXAMPLE 7 | Li | | 0 | — | 205 | 56.4 |
| COMPARATIVE EXAMPLE 8 | Li | 24200 | 0 | — | 212 | 57.1 |
| COMPARATIVE EXAMPLE 9 | Li | | 0 | — | 210 | 57.1 |
| COMPARATIVE EXAMPLE 10 | Li/Na | | 0 | — | 203 | 57.1 |
| COMPARATIVE EXAMPLE 11 | — | 21600 | — | — | 220 | 58.3 |
| COMPARATIVE EXAMPLE 12 | Li | 24200 | 5 | cmc | — | 51.5 |

| | EFFECT | | | | | |
|---|---|---|---|---|---|---|
| | PEELING STRENGTH (N/m) | SLURRY STABILITY | CHARGE CAPACITY (mAh/g) | DISCHARGE CAPACITY (mAh/g) | IRREVERSIBLE CAPACITY (mAh/g) | CHARGE/DISCHARGE EFFICIENCY (%) |
| EXAMPLE 1 | 73 | ☉ | 354 | 332 | 22 | 93.9 |
| EXAMPLE 2 | 67 | ☉ | 349 | 326 | 23 | 93.4 |
| EXAMPLE 3 | 74 | ☉ | 364 | 339 | 25 | 93.1 |
| EXAMPLE 4 | 78 | ☉ | 359 | 333 | 26 | 92.8 |
| EXAMPLE 5 | 76 | ☉ | 369 | 343 | 26 | 93.0 |
| EXAMPLE 6 | 60 | ☉ | 370 | 344 | 26 | 93.1 |
| EXAMPLE 7 | 59 | ☉ | 373 | 347 | 26 | 93.0 |
| EXAMPLE 8 | 76 | ☉ | 367 | 342 | 25 | 93.2 |
| EXAMPLE 9 | 71 | ☉ | 363 | 338 | 25 | 93.2 |
| EXAMPLE 10 | 72 | ☉ | 363 | 338 | 25 | 93.0 |
| EXAMPLE 11 | 70 | ☉ | 355 | 330 | 25 | 93.0 |
| EXAMPLE 12 | 87 | ☉ | 353 | 331 | 22 | 93.8 |
| EXAMPLE 13 | 90 | ☉ | 349 | 326 | 23 | 93.4 |
| EXAMPLE 14 | 88 | ☉ | 353 | 329 | 24 | 93.1 |
| EXAMPLE 15 | 63 | ☉ | 376 | 349 | 27 | 92.8 |
| COMPARATIVE EXAMPLE 1 | 61 | Δ | 374 | 349 | 25 | 93.3 |
| COMPARATIVE | 49 | Δ | 370 | 346 | 24 | 93.5 |

TABLE 1-continued

| | | | | | | |
|---|---|---|---|---|---|---|
| EXAMPLE 2 | | | | | | |
| COMPARATIVE EXAMPLE 3 | 60 | Δ | 358 | 336 | 22 | 93.8 |
| COMPARATIVE EXAMPLE 4 | 56 | Δ | 365 | 342 | 22 | 93.9 |
| COMPARATIVE EXAMPLE 5 | 70 | Δ | 365 | 341 | 25 | 93.2 |
| COMPARATIVE EXAMPLE 6 | 73 | Δ | 371 | 345 | 25 | 93.2 |
| COMPARATIVE EXAMPLE 7 | 55 | Δ | 361 | 336 | 25 | 93.1 |
| COMPARATIVE EXAMPLE 8 | 35 | X | 372 | 347 | 25 | 93.2 |
| COMPARATIVE EXAMPLE 9 | 36 | X | 355 | 331 | 24 | 93.3 |
| COMPARATIVE EXAMPLE 10 | 35 | X | 358 | 333 | 25 | 93.0 |
| COMPARATIVE EXAMPLE 11 | 38 | X | 353 | 321 | 32 | 90.8 |
| COMPARATIVE EXAMPLE 12 | 10 | X | 367 | 335 | 32 | 91.4 |

(Discussion)

In Examples 1 to 15 including the component (A), the component (B) and the component (C) of the present invention, it became clear that a slurry having excellent stability could be prepared by adding the component (C) in addition to the component (A) and the component (B).

Further, due to the effect of the neutralized salt constituting the component (B), high charge/discharge efficiency of 92% or more is realized even when the component (C) which is originally a resistance component is added, and it was shown that the charge/discharge efficiency is comparable to that of each of Comparative Examples 1 to 7. This is because a powdered active material was coated with a polymer salt of the component (B) to form an ionic conductive layer, so that Li ions could easily move inside the battery. Such an effect is assumed to be a result of the component (C) which did not prevent Li-ion transport without forming a gel-like formed body.

In contrast to the Examples according to the present invention, Comparative Examples 1 to 11 showed high charge/discharge efficiency, while the slurry stability was not sufficient as compared with that in the Examples. In addition, in the case where the conventional thickener shown in Comparative Example 12 was added, the adhesiveness, slurry stability, and charge/discharge efficiency were all lowered, so that it was also shown that an improvement of these physical properties was not achieved by only a simple thickening effect.

Test Example 2: Test of Binder Composition Containing Carboxylic Acid-Containing Polymer as Component (C)

Example 16

A binder aqueous solution was prepared in the same manner as in Example 1, except that polyacrylic acid (molecular weight: 250,000, manufactured by Aldrich Corp.) as a carboxylic acid-containing polymer was added at 1% by weight as a solid content to the mixture of (A-1) and (B-1), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 17

A binder aqueous solution was prepared in the same manner as in Example 16, except that polyacrylic acid was added at 4% by weight as a solid content to the mixture of (A-1) and (B-1), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 18

A binder aqueous solution was prepared in the same manner as in Example 17, except that the mixture ratio of (A-1) and (B-1) was changed to the ratio of (A-1):(B-1)=35:65 (by weight), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 19

A binder aqueous solution was prepared in the same manner as in Example 17, except that the mixture ratio of (A-1) and (B-1) was changed to the ratio of (A-1):(B-1)=45:

55 (by weight), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 20

A binder aqueous solution was prepared in the same manner as in Example 17, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 16, and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 21

A binder aqueous solution was prepared in the same manner as in Example 17, except that the carboxylic acid-containing polymer used was a lithium-modified isobutene-maleic anhydride copolymer (degree of neutralization: 0.5, molecular weight: 300,000), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 22

A binder aqueous solution was prepared in the same manner as in Example 17, except that the carboxylic acid-containing polymer was a poly(acrylic acid-maleic acid) (manufactured by Aldrich Corporation, molecular weight: 1,300), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 23

A target copolymer was synthesized in the same manner as in Example 16 except that 100 g of acrylic acid and 400 g of methanol were added. The amount of ethylenically unsaturated carboxylic acid modification of the obtained copolymer was 26.2 mol %. Further, 1.0 equivalent of lithium hydroxide relative to the carboxylic acid unit in the polymer was added thereto to prepare a neutralized salt (B-8) of the copolymer. Thereafter, the commercially available polyvinyl alcohol (A-1) used in Example 1 was added as a solid content so that the weight ratio of (A-1):(B-8) was 7:93. Furthermore, humic acid (manufactured by Aldrich Corp.) as a carboxylic acid-containing polymer was added in an amount of 0.01% by weight as a solid content to the mixture of (A-1) and (B3-8), thereby to prepare a binder aqueous solution. This solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 24

A binder aqueous solution was prepared in the same manner as in Example 10, except that a lithium-modified isobutene-maleic anhydride copolymer (degree of neutralization: 0.5, molecular weight: 300,000) as a carboxylic acid-containing polymer was added in an amount of 4% by weight as a solid component to the mixture of (A-2) and (B-3), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 25

A binder aqueous solution was prepared in the same manner as in Example 11, except that a lithium-modified isobutene-maleic anhydride copolymer (degree of neutralization: 0.5, molecular weight: 300,000) as a carboxylic acid-containing polymer was added in an amount of 4% by weight as a solid component to the mixture of (A-2) and (B-4), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 26

A binder aqueous solution was prepared in the same manner as in Example 12, except that a lithium-modified isobutene-maleic anhydride copolymer (degree of neutralization: 0.5, molecular weight: 250,000) as a carboxylic acid-containing polymer was added in an amount of 4% by weight as a solid component to the mixture of (A-1) and (B-5), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 27

A binder aqueous solution was prepared in the same manner as in Example 13, except that a lithium-modified isobutene-maleic anhydride copolymer (degree of neutralization: 0.5, molecular weight: 300,000) as a carboxylic acid-containing polymer was added in an amount of 4% by weight as a solid component to the mixture of (A-1) and (B-6), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 28

A binder aqueous solution was prepared in the same manner as in Example 27, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 27, and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Example 29

A binder aqueous solution was prepared in the same manner as in Example 15, except that a lithium-modified isobutene-maleic anhydride copolymer (degree of neutralization: 0.5, molecular weight: 300,000) as a carboxylic acid-containing polymer was added in an amount of 4% by weight as a solid component to the mixture of (A-1) and (B-7), and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

Comparative Example 13

A binder aqueous solution was prepared in the same manner as in Example 23 except that humic acid was not added, and the binder solution was used as a binder composition. A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 2 below.

TABLE 2

| | BINDER COMPOSITION | | | | | | |
|---|---|---|---|---|---|---|---|
| | (A) POLYVINYL ALCOHOL | | (B) COPOLYMER OF VINYL ALCOHOL AND ETHYLENICALLY UNSATURATED CARBOXYLIC ACID AND/OR NEUTRALIZED SALT THEREOF | | | | |
| | CONTENT (wt %) | DEGREE OF SAPONIFI-CATION (mol %) | CONTENT (wt %) | AMOUNT OF ETHYLENICALLY UNSATURATED CARBOXYLIC ACID MODIFICATION (mol %) | ETHYLENICALLY UNSATURATED CARBOXYLIC ACID | COPOLYMER FORM | DEGREE OF NEUTRAL-IZATION |
| EXAMPLE 16 | 10 | 98 | 90 | 73 | ACRYLIC ACID | GRAFT | 0.5 |

TABLE 2-continued

| | | | | | | | | |
|---|---|---|---|---|---|---|---|---|
| EXAMPLE 17 | 10 | 98 | 90 | 7.3 | ACRYLIC ACID | GRAFT | | 0.5 |
| EXAMPLE 18 | 35 | 98 | 65 | 7.3 | ACRYLIC ACID | GRAFT | | 0.5 |
| EXAMPLE 19 | 45 | 98 | 55 | 7.3 | ACRYLIC ACID | GRAFT | | 0.5 |
| EXAMPLE 20 | 10 | 98 | 90 | 7.3 | ACRYLIC ACID | GRAFT | | 0.5 |
| EXAMPLE 21 | 10 | 98 | 90 | 7.3 | ACRYLIC ACID | GRAB | | 0.5 |
| EXAMPLE 22 | 10 | 98 | 90 | 7.3 | ACRYLIC ACID | GRAFT | | 0.5 |
| EXAMPLE 23 | 7 | 98 | 93 | 26.2 | ACRYLIC ACID | GRAFT | | 1.0 |
| EXAMPLE 24 | 12 | 99 | 88 | 7.0 | METHACRYLIC ACID | GRAFT | | 0.5 |
| EXAMPLE 25 | 5 | 99 | 95 | 34.0 | METHACRYLIC ACID | GRAFT | | 0.5 |
| EXAMPLE 26 | 10 | 98 | 90 | 6.0 | ACRYLIC ACID | BLOCK | | 0.5 |
| EXAMPLE 27 | 10 | 98 | 90 | 12.0 | ACRYLIC ACID | BLOCK | | 0.5 |
| EXAMPLE 28 | 10 | 98 | 90 | 12.0 | ACRYLIC ACID | BLOCK | | 0.5 |
| EXAMPLE 29 | 10 | 98 | 90 | 5.0 | ACRYLIC ACID | RANDON | | 0.5 |
| COMPARATIVE EXAMPLE 13 | 7 | 98 | 93 | 26.2 | ACRYLIC ACID | GRAFT | | 1.0 |

| | (B) COPOLYMER OF VINYL ALCOHOL AND ETHYLENICALLY UNSATURATED CARBOXYLIC ACID AND/OR NEUTRALIZED SALT THEREOF | | (C) CARBOXYLIC ACID-CONTAINING POLYMER | | | HEAT RESISTANCE MELTING POINT (° C.) |
|---|---|---|---|---|---|---|
| | KIND OF SALTS | NUMBER AVERAGE MOLECULAR WEIGHT | CONTENT (% BY WEIGHT) RELATIVE TO (A) + (B) | KIND | MOLECULAR WEIGHT | |
| EXAMPLE 16 | Li | 24200 | 1 | POLYACRYLIC ACID | 250000 | 215 |
| EXAMPLE 17 | Li | 24200 | 4 | POLYACRYLIC ACID | 250000 | 216 |
| EXAMPLE 18 | Li | 24200 | 4 | POLYACRYUC ACID | 250000 | 215 |
| EXAMPLE 19 | Li | 24200 | 4 | POLYACRYLIC ACID | 250000 | 219 |
| EXAMPLE 20 | Li/Na | 24200 | 4 | POLYACRYUC ACID | 250000 | 220 |
| EXAMPLE 21 | Li | 24200 | 4 | LITHIUM-MODIFIED ISOBUTENE-MALEIC ANHYDRIDE COPOLYMER | 300000 | 216 |
| EXAMPLE 22 | Li | 24200 | 4 | POLY(ACRYLIC ACID-MALEIC ACID) | 1300 | 216 |
| EXAMPLE 23 | Li | 25100 | 0.01 | HUMIC ACID | — | 219 |
| EXAMPLE 24 | Li | | 4 | LITHIUM-MODIFIED ISOBUTENE-MALEIC ANHYDRIDE COPOLYMER | 300000 | 220 |
| EXAMPLE 25 | Li | | 4 | LITHIUM-MODIFIED ISOBUTENE-MALEIC ANHYDRIDE COPOLYMER | 300000 | 210 |
| EXAMPLE 26 | Li | | 4 | LITHIUM-MODIFIED ISOBUTENE-MALEIC ANHYDRIDE COPOLYMER | 250000 | 215 |
| EXAMPLE 27 | Li | | 4 | LITHIUM-MODIFIED ISOBUTENE- | 300000 | 212 |

TABLE 2-continued

| | | | | | | | |
|---|---|---|---|---|---|---|---|
| EXAMPLE 28 | Li/Na | | | 4 | MALEIC ANHYDRIDE COPOLYMER LITHIUM-MODIFIED ISOBUTENE-MALEIC ANHYDRIDE COPOLYMER | 300000 | 208 |
| EXAMPLE 29 | Li | | | 4 | LITHIUM-MODIFIED ISOBUTENE-MALEIC ANHYDRIDE COPOLYMER | 300000 | 204 |
| COMPARATIVE EXAMPLE 13 | Li | | 25100 | 0 | — | — | 219 |

| | BINDER COMPOSITION | EFFECT | | | | | |
|---|---|---|---|---|---|---|---|
| | SLURRY SOLID CONTENT CONCENTRATION [wt %] | PEELING STRENGTH (N/m) | SLURRY STABILITY | CHARGE CAPACITY (mAh/g) | DISCHARGE CAPACITY (mAh/g) | IRRE-VERSIBLE CAPACITY (mAh/g) | CHARGE/ DISCHARGE EFFICIENCY (%) |
| EXAMPLE 16 | 54.2 | 91 | ◎ | 372 | 349 | 23 | 93.8 |
| EXAMPLE 17 | 54.2 | 83 | ◎ | 372 | 346 | 26 | 92.9 |
| EXAMPLE 18 | 54.2 | 80 | ◎ | 371 | 345 | 26 | 93.0 |
| EXAMPLE 19 | 54.2 | 76 | ◎ | 369 | 342 | 27 | 92.7 |
| EXAMPLE 20 | 54.2 | 75 | ◎ | 365 | 339 | 26 | 92.8 |
| EXAMPLE 21 | 53.9 | 100 | ◎ | 379 | 352 | 27 | 93.0 |
| EXAMPLE 22 | 53.9 | 74 | ◎ | 360 | 338 | 22 | 93.8 |
| EXAMPLE 23 | 58.1 | 76 | ◎ | 361 | 339 | 22 | 94.0 |
| EXAMPLE 24 | 53.9 | 67 | ◎ | 360 | 338 | 22 | 93.8 |
| EXAMPLE 25 | 53.9 | 68 | ◎ | 360 | 337 | 23 | 93.7 |
| EXAMPLE 26 | 53.9 | 58 | ◎ | 364 | 339 | 25 | 93.1 |
| EXAMPLE 27 | 53.9 | 68 | ◎ | 369 | 343 | 26 | 92.9 |
| EXAMPLE 28 | 53.9 | 73 | ◎ | 364 | 338 | 26 | 92.9 |
| EXAMPLE 29 | 53.9 | 61 | ◎ | 366 | 338 | 28 | 92.3 |
| COMPARATIVE EXAMPLE 13 | 54.3 | 82 | Δ | 391 | 364 | 27 | 93.0 |

(Discussion)

In Examples 16 to 29 including the component (A), the component (B) and the component (C) of the present invention, it became clear that a slurry having excellent stability could be prepared by adding the component (C) in addition to the component (A) and the component (B). In contrast to the Examples according to the present invention, Comparative Example 13 showed a high charge/discharge efficiency, but on the other hand, the slurry stability was not sufficient as compared with the Examples.

[Test Example 3] Test of Binder Composition Containing Polyamines as Component (C)

Example 30

A binder aqueous solution was prepared in the same manner as in Example 1, except that a polyallylamine (molecular weight 1,600, manufactured by Nittobo Medical Co., Ltd.) as a polyamine was added in an amount of 1.0% by weight as a solid content to the mixture of (A-1) and (B-1), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 31

A binder aqueous solution was prepared in the same manner as in Example 30, except that the mixture ratio of (A-1) and (B-1) was (A-1):(B-1)=35:65 (by weight), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 32

A binder aqueous solution was prepared in the same manner as in Example 30, except that the mixture ratio of (A-1) and (B-1) was (A-1):(B-1)=45:55 (by weight), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 33

A binder aqueous solution was prepared in the same manner as in Example 30, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 1, and the obtained aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 34

A binder aqueous solution was prepared in the same manner as in Example 30, except that a polyallylamine (molecular weight 5,000, manufactured by Nittobo Medical Co., Ltd.) was used as a polyamine, and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 35

A binder aqueous solution was prepared in the same manner as in Example 30, except that a polyallylamine (molecular weight 5,000, manufactured by Nittobo Medical Co., Ltd.) was used as a polyamine, and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 36

A binder aqueous solution was prepared in the same manner as in Example 30, except that a polyethyleneimine (molecular weight 10,000, manufactured by Nittobo Medical Co., Ltd.) was used as a polyamine, and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 37

A binder aqueous solution was prepared in the same manner as in Example 9, except that a polyallylamine (molecular weight 1,600, manufactured by Nittobo Medical Co., Ltd.) as a polyamine was added in an amount of 1% by weight as a solid content to the mixture of (A-1) and (B-2), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 38

A binder aqueous solution was prepared in the same manner as in Example 10, except that a polyallylamine (molecular weight 1,600, manufactured by Nittobo Medical Co., Ltd.) as a polyamine was added in an amount of 1% by weight as a solid content to the mixture of (A-2) and (B-3), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 39

A binder aqueous solution was prepared in the same manner as in Example 11, except that a polyallylamine (molecular weight 1,600, manufactured by Nittobo Medical Co., Ltd.) as a polyamine was added in an amount of 1% by weight as a solid content to the mixture of (A-2) and (B-4), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 40

A binder aqueous solution was prepared in the same manner as in Example 12, except that a polyallylamine (molecular weight 1,600, manufactured by Nittobo Medical Co., Ltd.) as a polyamine was added in an amount of 1% by weight as a solid content to the mixture of (A-1) and (B-5), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 41

A binder aqueous solution was prepared in the same manner as in Example 40, except that a polyethyleneimine (molecular weight 1,600, manufactured by Nittobo Medical Co., Ltd.) was used as a polyamine, and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 42

A binder aqueous solution was prepared in the same manner as in Example 13, except that a polyallylamine (molecular weight 1,600, manufactured by Nittobo Medical Co., Ltd.) as a polyamine was added in an amount of 1% by weight as a solid content to the mixture of (A-1) and (B-6), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 43

A binder aqueous solution was prepared in the same manner as in Example 42, except that 0.2 equivalents of lithium hydroxide and 0.3 equivalents of sodium hydroxide relative to the carboxylic acid unit in the polymer were added to 100 g of a 10% by weight aqueous solution of the vinyl alcohol-acrylic acid copolymer prepared in Example 42, and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

Example 44

A binder aqueous solution was prepared in the same manner as in Example 15, except that a polyallylamine (molecular weight 1,600, manufactured by Nittobo Medical Co., Ltd.) as a polyamine was added in an amount of 1% by weight as a solid content to the mixture of (A-1) and (B-7), and the obtained binder aqueous solution was used as a binder composition.

A slurry for a non-aqueous electrolyte battery was prepared in the same manner as in Example 1 above, and the slurry stability was confirmed. Further, a coated negative electrode for the battery was prepared in the same manner as in Example 1 to obtain a coin battery, and then a charge/discharge characteristic test was performed. Similarly, a coated electrode for peeling strength was prepared in the same manner as in Example 1, and the peeling strength was measured. The results are shown in Table 3 below.

TABLE 3

| | BINDER COMPOSITION | | | | | | |
|---|---|---|---|---|---|---|---|
| | (A) POLYVINYL ALCOHOL | | (B) COPOLYMER OF VINYL ALCOHOL AND ETHYLENICALLY UNSATURATED CARBOXYLIC ACID AND/OR NEUTRALIZED SALT THEREOF | | | | |
| | CONTENT (wt %) | DEGREE OF SAPONIFI- CATION (mol %) | CONTENT (wt %) | AMOUNT OF ETHYLENICALLY UNSATURATED CARBOXYLIC ACID MODIFICATION (mol %) | ETHYLENICALLY UNSATURATED CARBOXYLIC ACID | COPOLYMER FORM | DEGREE OF NEUTRAL- IZATION |
| EXAMPLE 30 | 10 | 98 | 90 | 7.3 | ACRYLIC ACID | GRAFT | 0.5 |
| EXAMPLE 31 | 35 | 98 | 65 | 7.3 | ACRYLIC ACID | GRAFT | 0.5 |
| EXAMPLE 32 | 45 | 98 | 55 | 7.3 | ACRYLIC ACID | GRAFT | 0.5 |
| EXAMPLE 33 | 10 | 98 | 90 | 7.3 | ACRYLIC ACID | GRAFT | 0.5 |
| EXAMPLE 34 | 10 | 98 | 90 | 7.3 | ACRYLIC ACID | GRAFT | 0.5 |

TABLE 3-continued

| | | | | | | | |
|---|---|---|---|---|---|---|---|
| EXAMPLE 35 | 10 | 98 | 90 | 7.3 | ACRYLIC ACID | GRAFT | 0.5 |
| EXAMPLE 36 | 10 | 98 | 90 | 7.3 | ACRYLIC ACID | GRAFT | 0.5 |
| EXAMPLE 37 | 7 | 98 | 93 | 26.2 | ACRYLIC ACID | GRAFT | 0.5 |
| EXAMPLE 38 | 12 | 99 | 88 | 7.0 | METHACRYLIC ACID | GRAFT | 0.5 |
| EXAMPLE 38 | 5 | 99 | 95 | 34.0 | METHACRYLIC ACID | GRAFT | 0.5 |
| EXAMPLE 40 | 10 | 98 | 90 | 6.0 | ACRYLIC ACID | BLOCK | 0.5 |
| EXAMPLE 41 | 10 | 98 | 90 | 6.0 | ACRYLIC ACID | BLOCK | 0.5 |
| EXAMPLE 42 | 10 | 98 | 90 | 12.0 | ACRYLIC ACID | BLOCK | 0.5 |
| EXAMPLE 43 | 10 | 98 | 90 | 12.0 | ACRYLIC ACID | BLOCK | 0.5 |
| EXAMPLE 44 | 10 | 98 | 90 | 5.0 | ACRYLIC ACID | RANDOM | 0.5 |

| | (B) COPOLYMER OF VINYL ALCOHOL AND ETHYLENICALLY UNSATURATED CARBOXYLIC ACID AND/OR NEUTRALIZED SALT THEREOF | | (C) POLYAMINE | | | HEAT RESISTANCE MELTING POINT (° C.) |
|---|---|---|---|---|---|---|
| | KIND OF ACID | NUMBER AVERAGE MOLECULAR WEIGHT | CONTENT (% BY WEIGHT) RELATIVE TO (A) + (B) | KIND | MOLECULAR WEIGHT | |
| EXAMPLE 30 | Li | 24200 | 1 | POLYAMINE | 1600 | 220 |
| EXAMPLE 31 | Li | 24200 | 1 | POLYAMINE | 1600 | 216 |
| EXAMPLE 32 | Li | 24200 | 1 | POLYAMINE | 1600 | 213 |
| EXAMPLE 33 | Li/Na | 24200 | 1 | POLYAMINE | 1600 | 225 |
| EXAMPLE 34 | Li | 24200 | 1 | POLYAMINE | 5000 | 222 |
| EXAMPLE 35 | Li | 24200 | 1 | POLYAMINE | 5000 | 219 |
| EXAMPLE 36 | Li | 24200 | 1 | POLYAMINE | 10000 | 226 |
| EXAMPLE 37 | Li | 25100 | 1 | POLYAMINE | 1600 | 225 |
| EXAMPLE 38 | Li | | 1 | POLYAMINE | 1600 | 227 |
| EXAMPLE 38 | Li | | 1 | POLYAMINE | 1600 | 213 |
| EXAMPLE 40 | Li | | 1 | POLYAMINE | 1600 | 215 |
| EXAMPLE 41 | Li | | 1 | POLYAMINE | 1600 | 214 |
| EXAMPLE 42 | Li | | 1 | POLYAMINE | 1600 | 215 |
| EXAMPLE 43 | Li/Na | | 1 | POLYAMINE | 1600 | 210 |
| EXAMPLE 44 | Li | | 1 | POLYAMINE | 1600 | 209 |

| | BINDER COMPOSITION | EFFECT | | | | | |
|---|---|---|---|---|---|---|---|
| | SLURRY SOLID CONTENT CONCENTRATION [wt %] | PEELING STRENGTH (N/m) | SLURRY STABILITY | CHARGE CAPACITY (mAh/g) | DISCHARGE CAPACITY (mAh/g) | IRRE- VERSIBLE CAPACITY (mAh/g) | CHARGE/ DISCHARGE EFFICIENCY (%) |
| EXAMPLE 30 | 57.1 | 95 | ◎ | 357 | 332 | 25 | 93.1 |
| EXAMPLE 31 | 57.1 | 89 | ◎ | 360 | 335 | 25 | 93.1 |
| EXAMPLE 32 | 57.1 | 83 | ◎ | 369 | 343 | 26 | 93.0 |
| EXAMPLE 33 | 57.1 | 93 | ◎ | 360 | 334 | 26 | 92.8 |
| EXAMPLE 34 | 57.1 | 102 | ◎ | 361 | 335 | 26 | 92.8 |
| EXAMPLE 35 | 56.9 | 80 | ◎ | 360 | 335 | 25 | 93.1 |
| EXAMPLE 36 | 58.0 | 70 | ◎ | 360 | 336 | 25 | 93.2 |
| EXAMPLE 37 | 57.1 | 89 | ◎ | 370 | 344 | 26 | 93.0 |
| EXAMPLE 38 | 57.5 | 98 | ◎ | 374 | 348 | 26 | 93.0 |
| EXAMPLE 38 | 57.1 | 78 | ◎ | 373 | 348 | 25 | 93.3 |
| EXAMPLE 40 | 57.1 | 100 | ◎ | 362 | 338 | 24 | 93.3 |
| EXAMPLE 41 | 57.1 | 84 | ◎ | 359 | 334 | 25 | 93.0 |
| EXAMPLE 42 | 57.1 | 90 | ◎ | 362 | 339 | 23 | 93.6 |
| EXAMPLE 43 | 57.1 | 91 | ◎ | 365 | 339 | 26 | 92.8 |
| EXAMPLE 44 | 58.3 | 91 | ◎ | 368 | 342 | 26 | 92.9 |

(Discussion)

In Examples 30 to 44 including the component (A), the component (B) and the component (C) of the present invention, it became clear that a slurry having excellent stability could be prepared by adding the component (C) in addition to the component (A) and the component (B). Further, due to the effect of the neutralized salt constituting the component (B), a high charge/discharge efficiency of 92% or more could be realized even when the component (C) which is originally a resistance component was added, and such a high charge/discharge efficiency was comparable to that shown in each of Comparative Examples 1 to 13. This is because a powdered active material was coated with the polymer salt of the component (B) to form an ionic conductive layer, so that Li ions could easily move inside the battery. Such an effect is assumed to be a result of the component (C) which did not prevent Li-ions from being transported without forming a gel-like formed body.

This application is based on Japanese Patent Application Nos. 2017-112716, 2017-112717 and 2017-112718 filed on Jun. 7, 2017, the contents of which are included in the present application.

In order to express the present invention, the present invention has been appropriately and fully described by way of embodiments with reference to the specific examples and the like in the above; however, it is to be recognized that those skilled in the art can readily make changes and/or modifications on the above-described embodiments. Therefore, it is to be interpreted that the changed modes or modified modes carried out by those skilled in the art are encompassed within the scope of the rights of the claims unless those changed modes or modified modes are at a level that departs from the scope of the rights of the claims as given in the claims section of the present specification.

INDUSTRIAL APPLICABILITY

The present invention has wide industrial applicability in the technical field relating to a non-aqueous electrolyte battery such as a lithium ion secondary battery.

The invention claimed is:

1. A binder composition, comprising:
   (A) polyvinyl alcohol,
   (B) at least one selected from the group consisting of a copolymer of vinyl alcohol and ethylenically unsaturated carboxylic acid and a neutralized salt of the copolymer, and
   (C) a carboxylic acid-containing polymer which is at least one selected from the group consisting of a maleic acid-acrylic acid copolymer, an isobutene-maleic acid copolymer, and neutralized salts thereof.

2. The binder composition according to claim 1, wherein the component (B) is copolymerized in a form of block copolymerization.

3. The binder composition according to claim 1, wherein the component (B) is copolymerized in a form of graft copolymerization.

4. The binder composition according to claim 1, wherein in the component (B), an amount of ethylenically unsaturated carboxylic acid modification is from 0.1 to 60 mol %.

5. The binder composition according to claim 1, comprising the component (B) for an amount of from 50.0 to 99.9% by weight.

6. A binder composition, comprising:
   (A) polyvinyl alcohol,
   (B) at least one selected from the group consisting of a copolymer of vinyl alcohol and ethylenically unsaturated carboxylic acid and a neutralized salt of the copolymer, and
   (C) a polyamine.

7. A binder aqueous solution, comprising:
   the binder composition according to claim 1 and water.

8. A slurry composition, comprising:
   the binder composition according to claim 1, an active material, and water.

9. An electrode, comprising:
   a mixed layer, comprising the binder composition according to claim 1 and an active material, and
   a current collector,
   wherein the mixed layer is bound to the current collector.

10. A non-aqueous electrolyte battery, comprising the electrode according to claim 9.

11. The binder composition according to claim 6, wherein the component (B) is copolymerized in a form of block copolymerization.

12. The binder composition according to claim 6, wherein the component (B) is copolymerized in a form of graft copolymerization.

13. The binder composition according to claim 6, wherein in the component (B), an amount of ethylenically unsaturated carboxylic acid modification is from 0.1 to 60 mol %.

14. The binder composition according to claim 6, comprising the component (B) for an amount of from 50.0 to 99.9% by weight.

15. A binder aqueous solution, comprising:
   the binder composition according to claim 6 and water.

16. A slurry composition, comprising:
   the binder composition according to claim 6, an active material, and water.

17. An electrode, comprising:
   a mixed layer, comprising the binder composition according to claim 6 and an active material, and
   a current collector,
   wherein the mixed layer is bound to the current collector.

18. A non-aqueous electrolyte battery, comprising the electrode according to claim 17.

19. A binder composition, comprising:
   (A) polyvinyl alcohol,
   (B) at least one selected from the group consisting of a copolymer of vinyl alcohol and ethylenically unsaturated carboxylic acid and a neutralized salt of the copolymer, and
   (C) at least one selected from the group consisting of an amino acid, a carboxylic acid-containing polymer, and a polyamine, wherein the component (B) is copolymerized in a form of block copolymerization.

* * * * *